2 Sheets--Sheet 1.
J. J. HOYT.
Formation of Glass Lamps.
No. 164,374.
Patented June 15, 1875.
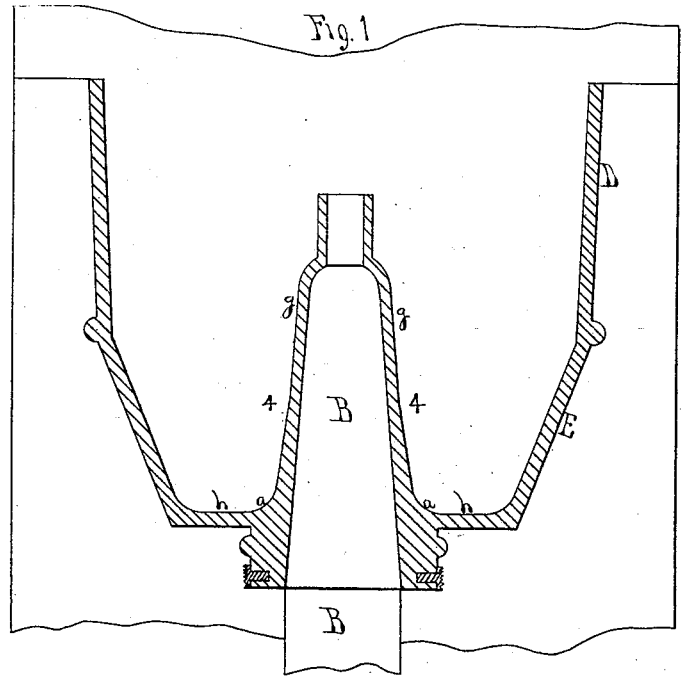
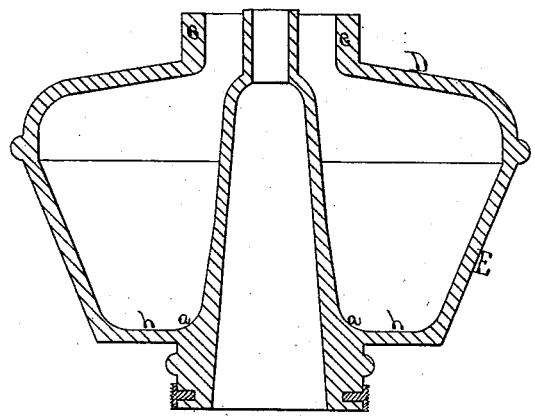
Witnesses
John E. Crane
Wm. S. Brown
Inventor
Jonᵃ J. Hoyt 2 Sheets--Sheet 2.

J. J. HOYT.
Formation of Glass Lamps.

No. 164,374. Patented June 15, 1875.

Witnesses
John E. Crane
Wm. S. Brown

Inventor
Jon. a. J. Hoyt

THE GRAPHIC CO.PHOTO-LITH.39 & 41 PARK PLACE,N.Y.

UNITED STATES PATENT OFFICE.

JONATHAN J. HOYT, OF CHELMSFORD, ASSIGNOR TO THE STANDARD-LAMP AND GLASS-PIPE COMPANY, OF BOSTON, MASSACHUSETTS.

IMPROVEMENT IN THE FORMATION OF GLASS LAMPS.

Specification forming part of Letters Patent No. 164,374, dated June 15, 1875; application filed December 17, 1874.

*To all whom it may concern:*

Be it known that I, JONATHAN J. HOYT, of Chelmsford, in the county of Middlesex and State of Massachusetts, have invented a new and useful improvement in the process of forming glass lamps with a central wick and draft tube of glass in one piece with the lamp, and small enough to permit the wick of the lamp to surround it, of which the following is a specification, accompanied by illustrative drawings—

Figure 3:
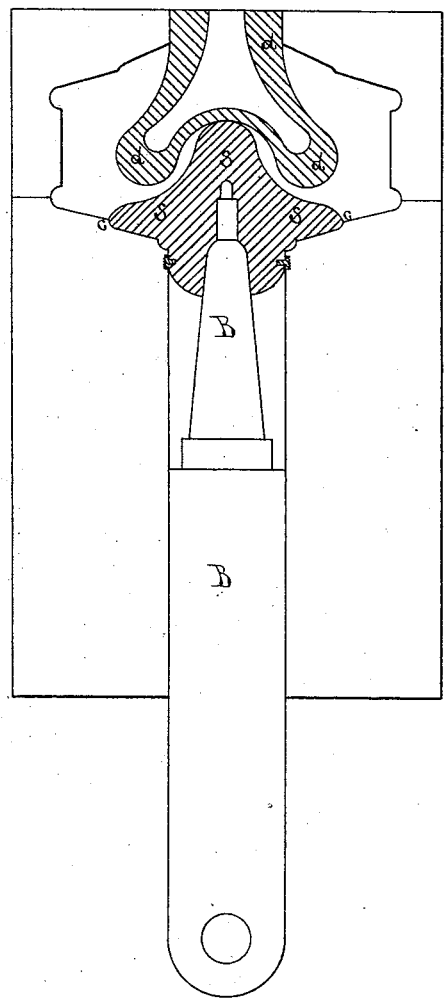
Figure 4:
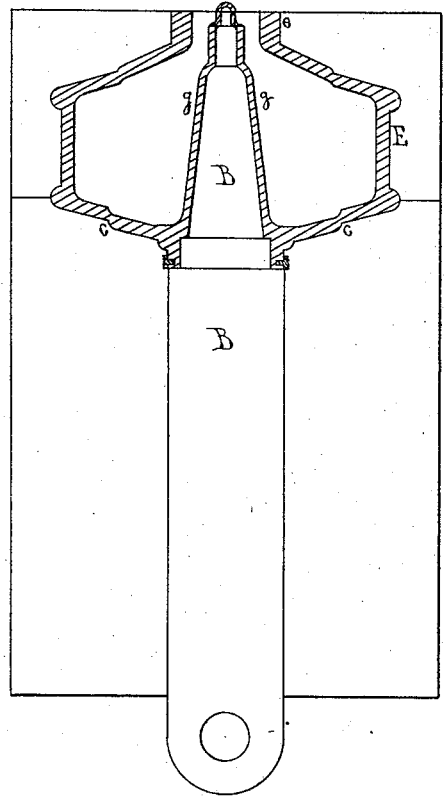

Figures 1 and 3 of which represent sectional elevations of partly-formed glass lamps, Fig. 1 being a pressed lamp, and Fig. 3 a blown lamp; Figs. 2 and 4, sectional elevations of fully-formed glass lamps, Fig. 2 being a pressed lamp, and Fig. 4 a blown lamp, each having a central Argand wick and draft tube, $g$, produced or formed by my process and invention.

My process consists essentially in forming the lamp and its tube $g$ around a small or slender central vertical pin or plunger, B, and withdrawing the latter after the glass tube has become sufficiently cooled to retain the form given it by the pin, and before it has contracted around the pin, substantially as hereinafter described.

In forming the said Argand central wick and draft tube $g$ and the lamp E concentrically with each other by the pressing process, a suitable mold is prepared that will give the desired external form to the body E, and the bottom $h\ h$ of the lamp, and also to an upward extension, D, as shown in Fig. 1, which afterward forms the dome D of the lamp. Through the bottom of the mold a small movable vertical pin or plunger, B, is applied, capable of being thrown upward and set in position to form the interior of the tube $g$, and of being withdrawn after the formed tube has become sufficiently cooled to retain its form. Above the pressing-mold, and having its center in a vertical line with the center of the mold, is a vertically-moving hollow plunger having its external form corresponding with the internal form of the mold, but in dimensions so much smaller than the interior of the mold as to leave room for the required thickness of glass which forms the body E and the extension D.

This hollow plunger, or the annular cavity therein, is of nearly the same form of the pin B, the difference in form being a slight enlargement of the pin from about the line 4 4, Fig. 1, downward, and increasing in diameter to the end, and rounded out, so as to leave ample room for the plastic glass to rise, or to be forced upward, between the exterior of the pin and the interior of the cavity in the top plunger, when the latter is depressed or forced downward into the mold and over the pin.

To practice my process, after the mold has been prepared in the usual way, and set and adjusted beneath the top plunger, a sufficient quantity of hot plastic glass is placed in the bottom of the mold around the base of the pin B, which is set or passed up through the bottom of the mold to the full height of the desired tube. The top plunger is then brought down with force, and the hot plastic glass, being of a suitable consistency, is forced by the action of the top plunger both outside of the latter and inside of the mold, and inside of the plunger and outside of the pin, in a sheet or shell that forms both the body and bottom of the lamp and the extension D, and also the tube $g$, all at the same operation or stroke. As soon as the thus-pressed glass is sufficiently cooled to allow the tube $g$ to retain its form, and before the glass has contracted around the pin, which will be understood by glass-blowers and ascertained by observation, the bottom pin B is withdrawn from the pressed tube, the mold opened, and the partly-finished lamp removed. The extension D is then reheated, and spun or formed over by hand into the dome D of the lamp, and its neck $e$, so that the latter shall be concentric, or nearly so, with the upper end of the tube $g$ within the lamp, to form the perfect lamp, as seen in Fig. 2. In this lamp the tube $g$ will be a little thicker at the base from the line 4 4 downward, and curved inside, as at $a$; but this is no objection, and it tends to stiffen the tube, and to cause it to better retain its form after the pin has been withdrawn; and, besides this, there exists a necessity for a widening of the space between the base of the pin and interior space in the lower end of the hollow top plunger, in order to allow room for the hot plastic glass to be forced upward to form the tube $g$, around the whole length or height of the pin as it stands in the center of the mold.

Great care should be exercised to withdraw the pin B at the proper moment, for if it is allowed to remain in the hot glass tube too long the tube $g$ will contract around the pin, and either adhere to it so firmly that it cannot be removed, or will crinkle or crack the glass of the tube, so as to render it imperfect. The pin B will also be rendered too hot by the glass, and the succeeding lamp will adhere to the pin when molded, if the pin be kept too long within the tube $g$. The pin B, being slender, heats very readily above the proper temperature, unless such care is taken in withdrawing it at the proper moment.

To apply my process perfectly and rapidly in the manufacture of these lamps, the pin should be heated to a certain extent, and kept at that temperature, due care being exercised not to allow the pin B to become red, or quite red, hot, as the cheapness and perfection of the lamps depend upon this care in maintaining the proper temperature in the pin.

Instead of withdrawing the pin B from the lamp, as above described, the lamp, with its tube $g$, may be withdrawn from the pin at the proper moment, while the latter remains stationary.

In forming the said Argand central wick and draft tube $g$ and the lamp E by the glass-blowing process, a suitable mold is prepared that will give the entire external form to the lamp, and through the bottom or lower portion of the mold a slender movable vertical pin or plunger, B, is applied, as in the mold for pressing the lamp, and the central tube, and this pin B in either mold for blowing is arranged to be raised and withdrawn by a lever or other suitable mechanism, and I withdraw the pin from the formed glass tube $g$ before the latter contracts around the pin, and after the tube has become sufficiently cooled to retain its form, as described above. Preparatory to blowing the lamp and forming the tube $g$ around the pin B, the pin is withdrawn, as seen in Fig. 3, and a quantity of hot plastic glass, S, is placed in the lower part of the mold, and over the top of the pin, and quickly tamped down, about as shown in Fig. 3, and at the same time, or as soon as practicable after tamping down the said glass, a second quantity of hot glass gathered on the end of a blow-pipe, and the blowing started, is placed in the upper part of the mold in the form of a sack, $d$. At this time the pin B is started and moved upward, carrying with it a portion of the tamped glass S, and drawing such glass upward and forming it around the pin, as the tube $g$, by the rising of the pin to its full height, and while thus forming the tube by raising the pin B, the sack $d$ of glass is blown and forms the body E of the lamp, the two portions of hot glass uniting about at $c$ in the lower part of the mold, and the lower part of the blown sack $d$ forms in a thin layer over the outside of the tube first formed, and both being sufficiently heated, they unite together, the lamp and the central tube being formed simultaneously. After the lamp is blown, and the tube $g$ formed as described, the pin B is removed at the proper moment, before the glass of the tube has contracted around it, the same as when forming the tube by pressing it and the lamp, as before described.

It will be understood that the pin B must not be allowed to become heated to a red heat, as in that case the tube $g$ of glass would unite with the pin. The same care should be exercised in withdrawing the pin at the proper moment to prevent its undue heating, or injury to the newly-formed tube, as above described, as well as in keeping it at a proper temperature. If the pin B is withdrawn from the newly-formed tube of glass $g$ too soon, and while the glass is still in a plastic state, and before it has cooled sufficiently to maintain its form given it by the pin, the tube $g$ will settle down, and be so bent from its proper form and position that the lamp will be practically valueless. Hence the limit of the time for withdrawing the pin B is after the glass has ceased to be plastic, and before it has contracted around the pin to any substantial extent.

What I claim as new and my invention is—

1. The process of forming the glass lamp and its glass central wick draft-tube $g$ concentric with its circumference, by forming it and the said tube upon the pin B, and withdrawing the latter after the tube has cooled sufficiently to retain its form, and before it has appreciably contracted around the pin, substantially as described.

2. The process of molding the glass lamp and its glass central wick draft-tube $g$, and then spinning the dome or top and neck of the lamp over to form the opening through the neck concentric with the upper end of the tube $g$, substantially as described.

JONA. J. HOYT.

Witnesses:
JOHN E. CRANE,
WM. S. BROWN.